No. 815,163. PATENTED MAR. 13, 1906.
S. P. HATFIELD.
APPARATUS FOR LAYING ELECTRIC CONDUCTORS.
APPLICATION FILED MAR. 18, 1904.
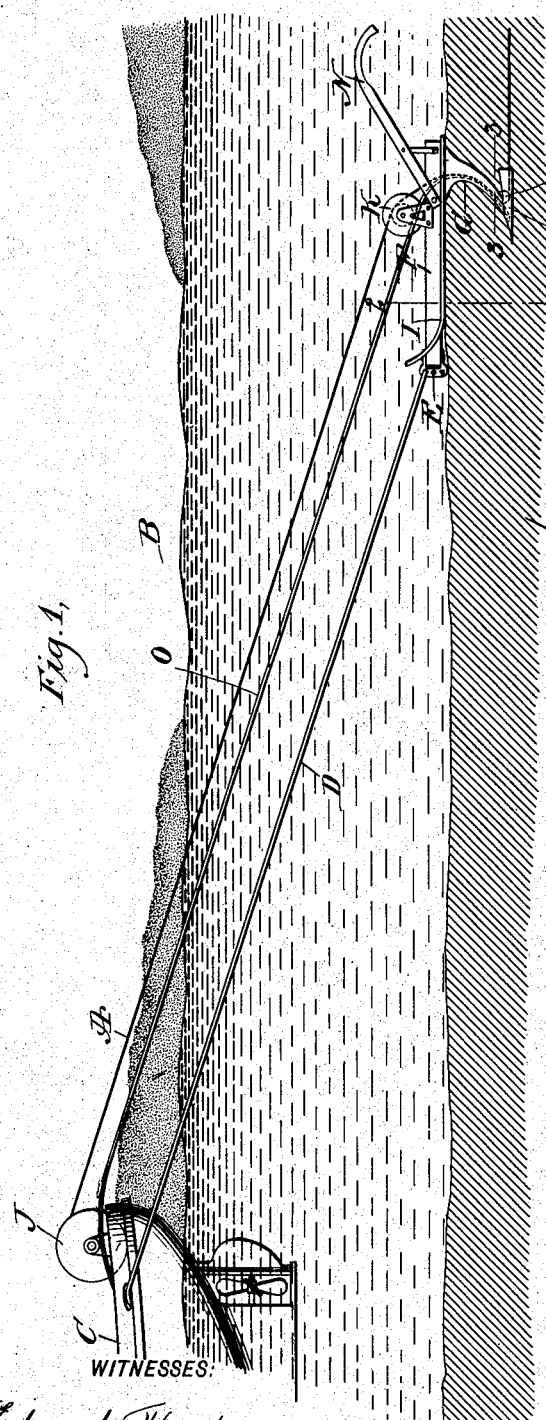
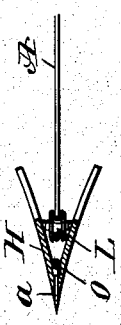
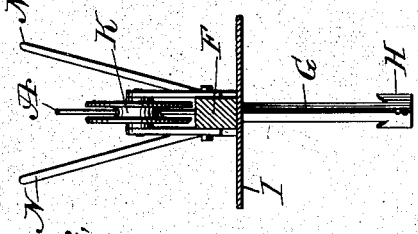
WITNESSES:
Edward Thorpe
Theo. J. Hoskin
INVENTOR
Samuel P. Hatfield
BY 
ATTORNEYS

UNITED STATES PATENT OFFICE.

SAMUEL PROAL HATFIELD, OF NEW YORK, N. Y.

APPARATUS FOR LAYING ELECTRIC CONDUCTORS.

No. 815,163.          Specification of Letters Patent.          Patented March 13, 1906.

Application filed March 18, 1904. Serial No. 198,858.

*To all whom it may concern:*

Be it known that I, SAMUEL PROAL HATFIELD, a citizen of the United States, and a resident of the city of New York, Rockaway Beach, borough of Queens, in the county of Queens and State of New York, have invented a new and Improved Apparatus for Laying and Burying Electric Conductors on Land and under Water, of which the following is a full, clear, and exact description.

The object of the invention is to provide a new and improved apparatus for laying and burying electric conductors on land and under water in a very simple and comparatively inexpensive manner to prevent the conductors from being fouled by the anchors of marine vessels and to prevent the conductors from being easily detected or grappled and cut in time of war.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement in position for laying and burying an electric cable in the bed of a waterway. Fig. 2 is an enlarged transverse section of the improvement on the line 2 2 of Fig. 1, and Fig. 3 is an enlarged sectional plan view of the same on the line 3 3 of Fig. 1.

In laying and burying a cable A, for instance, in the bed B' of a waterway B, I prefer to make use of a marine vessel C, connected from its stern by a hawser or like connection D with a clevis E on the front end of the plow-beam F of a plow somewhat in the form of a subsoil-plow, as illustrated in the drawings. The plow is provided with a standard G, preferably made V shape in cross-section, and a plowshare H, similar in shape, so that on drawing the plow forward a self-closing furrow is made, the depth of which is regulated by a gage-plate I, preferably attached to the under side of the plow-beam F and somewhat curved upwardly and forwardly at the front end, so as to cause the plow to readily ride on the surface of the ground and to conform to the undulations thereof.

The cable A, as shown in Fig. 1, unwinds from a spool J, held on board the vessel C, and extends over a drum K, journaled on the plow-beam F, the cable then passing downward through the space between the side flanges of the V-shaped standard G to finally pass around a guide L in the shape of a roller journaled between the side members of the share (see Fig. 3) and serving to direct the cable into the lower or bottom portion of the furrow made by the share.

It is evident that when the vessel C is started the plow is dragged along on the bed B' of the waterway, so that the share H makes a furrow, and as one end of the cable A is held on land it is evident that the cable is readily paid out into the self-closing furrow and is thus covered up a suitable distance below the surface of the bed B' to prevent the cable from being fouled by dragging anchors and also to prevent the cable from being easily detected or grappled and cut in time of war. Other suitable means may be employed to drag the plow over the bed of the waterway, as a windlass stationed on shore, for instance.

For laying and burying the cable on land the plow may be pulled along by teams, power-vehicles, or other means; but in this case the plow is guided by an operator having hold of handles N, attached to the plow-beam in the usual manner.

If desired, the drum on which the cable is wound may be used directly on the plow in the place of the drum K, and this arrangement is especially serviceable when burying cables on land.

In order to insure an easy working of the plow, especially in hard ground or well-packed sand, it may prove beneficial to use a jet of water injected into the ground at the plow-point, and for this purpose a hose O may be employed, extending from a pump on the vessel C to the plow and along the rear of the standard to a port or channel a, formed in the plow-point and leading to the front thereof. Now when the pump is working a jet of water is forced by way of the hose O and port a into the sand or ground ahead of the plow-point to loosen the material, and thus insure an easy working of the plow.

Having thus described my invention, I claim as new and desire to secure by Letters Patent—

1. An apparatus for laying and burying electric conductors under ground, comprising a plow arranged for forming a self-closing furrow, a gage projecting on opposite sides of the plow-beam and extending approximately the length thereof and means on the plow for directing the conductor into the lower portion of the furrow, as set forth.

2. An apparatus for laying and burying electric conductors under ground, comprising a plow arranged for forming a self-closing furrow, a gage secured to the plow-beam and extending on opposite sides of the same, the gage having an upwardly-curved forward end, and means on the plow for directing the conductor into the lower portion of the furrow, between the shares of the plow.

3. An apparatus for laying and burying electric conductors under ground, comprising a plow arranged for forming a self-closing furrow, a drum on the plow-beam, and means on the plow for directing the conductor from the drum into the lower portion of the furrow, between the shares of the plow and in the rear of the standard of the plow, as set forth.

4. An apparatus for laying and burying electric conductors under ground, consisting of a plow having a gage-plate between the plow-beam and the share, a drum journaled on the plow-beam, and a guide on the share, for directing the conductor into the lower portion of the furrow made by the plow, as set forth.

5. In an apparatus for laying and burying electric conductors, the combination with a propelling vessel, of a plow having a port leading out through the front of its point, a flexible connection between the plow and the vessel to drag the plow along, means for directing the conductor from the vessel to the plow and into the furrow made by the plow, and a hose leading from a forced water-supply on the vessel to the rear of the plow-standard and connected with the port in the plow-point.

6. In an apparatus for laying and burying electric conductors, the combination with a propelling vessel, of a plow, a flexible connection between the plow and the vessel to drag the plow along, means for directing the conductor from the vessel to the plow and into the furrow made by the plow, and a gage-plate on the plow between the plow-beam and the share.

In testimony whereof I have signed my name to this specification in the presence of two subscribing witnesses.

SAMUEL PROAL HATFIELD.

Witnesses:
   WILLIAM J. TATE,
   A. C. VANDERPOOL.